(12) United States Patent
Aggarwal et al.

(10) Patent No.: US 10,672,034 B2
(45) Date of Patent: Jun. 2, 2020

(54) DOCUMENT CONSUMPTION AND VALUE ADD SERVICES

(71) Applicant: Adobe Inc., San Jose, CA (US)

(72) Inventors: Anurag Aggarwal, Noida (IN); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 370 days.

(21) Appl. No.: 15/096,021

(22) Filed: Apr. 11, 2016

(65) Prior Publication Data

US 2017/0293940 A1 Oct. 12, 2017

(51) Int. Cl.
*G06Q 30/02* (2012.01)
*G06F 3/0482* (2013.01)

(52) U.S. Cl.
CPC ....... *G06Q 30/0269* (2013.01); *G06F 3/0482* (2013.01)

(58) Field of Classification Search
CPC ............................... H04L 67/24; G06G 17/24
See application file for complete search history.

(56) References Cited

U.S. PATENT DOCUMENTS

| | | | | |
|---|---|---|---|---|
| 6,327,550 B1* | 12/2001 | Vinberg | ............. | G06F 11/3006 700/48 |
| 6,487,541 B1* | 11/2002 | Aggarwal | ............. | G06Q 30/02 705/14.4 |
| 6,976,133 B1* | 12/2005 | Wynn | ....................... | G06F 8/65 709/215 |
| 7,184,410 B1* | 2/2007 | Frankel | ........... | H04B 10/25137 370/252 |
| 9,118,763 B1* | 8/2015 | Margulies | ........... | H04M 3/5191 |
| 9,256,784 B1* | 2/2016 | Taylor | ............... | G06K 9/00597 |
| 9,531,822 B1* | 12/2016 | Lintz | ...................... | H04L 67/22 |
| 9,720,577 B1* | 8/2017 | Sahasi | ................. | H04N 21/252 |
| 2003/0105769 A1* | 6/2003 | Harris | .................... | G06Q 10/10 |
| 2006/0136821 A1* | 6/2006 | Barabe | ............... | G06F 17/2288 715/205 |
| 2008/0030496 A1* | 2/2008 | Lee | ....................... | G06Q 10/10 345/418 |
| 2008/0082687 A1* | 4/2008 | Cradick | ................. | G06F 17/24 709/246 |
| 2011/0078588 A1* | 3/2011 | Klemm | .................. | G06Q 10/10 715/753 |
| 2014/0201613 A1* | 7/2014 | Della Corte | ...... | G06F 17/30719 715/233 |

(Continued)

*Primary Examiner* — Jennifer N To
*Assistant Examiner* — Qi Wan
(74) *Attorney, Agent, or Firm* — SBMC

(57) ABSTRACT

Document consumption and value add service techniques and systems are described. In one example, a digital medium environment is configured to control availability of a value add service to consumers of a document. Consumption data is collected from a plurality of client devices. The consumption data describes characteristics of consumption of the document by respective client devices. A readership index is calculated that describes an amount of overall consumption of the document by the plurality of client devices. Responsive to a determination by the computing device that the readership index has exceeded a threshold, the value add service that relates to the document is exposed for interaction by at least one of the plurality of client devices.

20 Claims, 9 Drawing Sheets

(56) References Cited

U.S. PATENT DOCUMENTS

| | | | |
|---|---|---|---|
| 2015/0113007 A1* | 4/2015 | Hatchard | G06Q 10/00 707/754 |
| 2015/0172403 A1* | 6/2015 | Steinbok | H04L 67/24 709/205 |
| 2015/0269488 A1* | 9/2015 | Galai | H04L 67/22 706/11 |

* cited by examiner

702
Collect consumption data from a plurality of client devices, the consumption data describing characteristics of consumption of the document by respective said client devices

704
Calculate a readership index that describes an amount of overall consumption of the document by the plurality of client devices

706
Responsive to a determination that the readership index has exceeded a threshold, expose a value add service relating to the document by the computing device for interaction by at least one of the plurality of client devices

*Fig. 7*

DOCUMENT CONSUMPTION AND VALUE ADD SERVICES

BACKGROUND

A multitude of users interact with billions of documents every day. As part of this interaction, users are able to read text and view illustrations in static examples (e.g., read only) and even edit the documents in dynamic examples. Thus, consumption of documents by users underlies one of the primary techniques used to convey and obtain information by users on a variety of different subjects, such as news, research papers, letters, legal documents, and so on.

In conventional instances, however, this interaction is typically separated from an originator of the document. For example, an originator of the document, such as an author, is unable to engage users while interacting with the document. This removes an ability of the author to promote upcoming documents, observe how the document is being consumed, or obtain real time feedback from these users.

SUMMARY

Document consumption and value add service techniques and systems are described. In one or more embodiments, a digital medium environment is configured to control availability of a value add service to consumers of a document. Consumption data is collected from a plurality of client devices. The consumption data describes characteristics of consumption of the document by respective client devices, e.g., duration, number of client devices, and so forth. A readership index is calculated that describes an amount of overall consumption of the document by the plurality of client devices from this consumption data.

A determination is then made by the computing device that the readership index has exceeded a threshold. In response, a value add service that relates to the document is exposed for interaction by at least one of the plurality of client devices. Examples of value add services include a question and answer session with an originator of the document, a live survey, a communication session with the originator of the document, or a personalized message from the originator of the document. In this way, consumption of a static document is transformed into an interactive experience through use of the value add services.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6 depicts an example user interface in accordance with one embodiment having a concurrent display of a document along with a portion of a readership index.

FIG. 7 is a flow diagram depicting a procedure in accordance with one embodiment in which control is described of exposure of value add services as part of document consumption.

DETAILED DESCRIPTION

Overview

Figure 1:
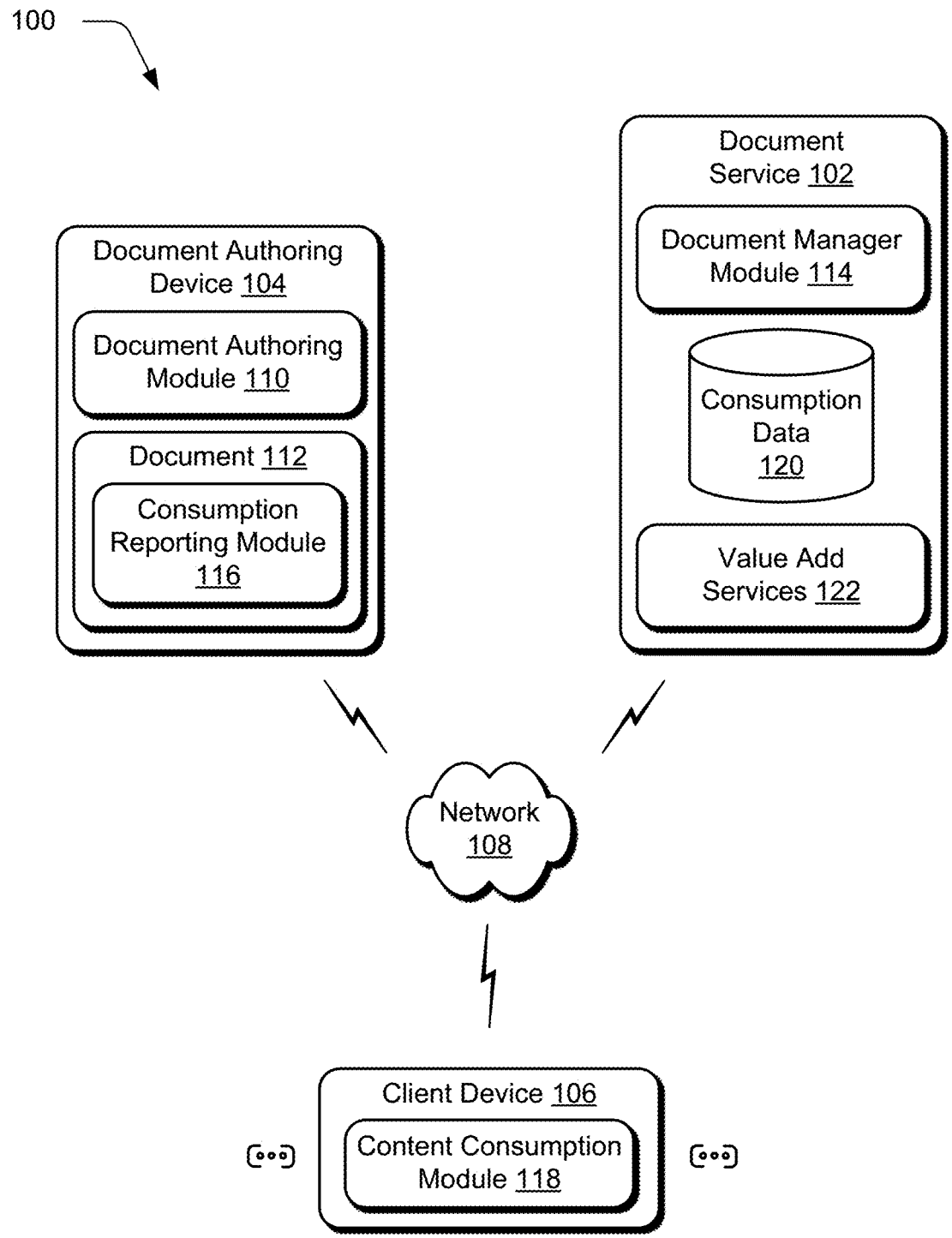
FIG. 1 is an illustration of an environment in accordance with one embodiment that is operable to employ techniques described herein.

Documents are one of the primary techniques used to convey information, e.g., from an author of the documents to users that read the document. For example, billions of documents are consumed every day by a multitude of users on a variety of different subjects. Consumption of conventional documents, however, is divorced from an originator (e.g., author) that created the document, thereby limiting opportunities of the originator to learn how the document is consumed as well as limiting users from an ability to expand consumption of the document.

Accordingly, techniques are described to enrich a consumptive experience of documents through use of value add services. In an example, a document includes an embedded module that is configured to communicate consumption data that describes characteristics of interaction by respective client devices. For example, a user reading a technical journal may have characteristics describing this interaction communicated to a document service. The characteristics may include an identifier of the document, a duration specifying an amount of time the document was consumed and even particular portions of the document, a subscription identifier specifying a subscription associated with a respective user that consumed the document, details describing characteristics of the respective user, details describing characteristics of a respective said client device used to consume the document, or an IP address of the respective said client device used to consume the document.

Consumption data from a plurality of these client devices is collected by a document service in order to control availability of value add services as further described below based at least in part of a readership index computed from the consumption data. The readership index describes overall consumption of the document by the plurality of client devices. This may include a number of client devices currently consuming the document. This may also include a duration of the consumption and even take into account a distribution channel used to obtain the document (e.g., email, download), and so forth. The readership index is then compared to a threshold to control exposure of the value add service, such as when the readership index has exceeded the threshold. The threshold, for instance, refers to a specific amount of overall consumption that triggers availability of the value add services. In one example, the threshold is an indicator of a minimum value of readers that have read a sufficient portion of the document.

Once the readership index has exceeded the threshold, value add services are exposed to the client devices currently consuming the document to support interaction via a network to expand functionality available from the document. This may be performed first by notifying the originator of the document and giving the originator options to select particular value add services. In another example, the value add service is selected beforehand and output automatically without user intervention when the readership index has crossed the threshold.

Value add services may take a variety of forms, such as a question and answer session with an originator of the document, a live survey, a communication session with the originator of the document, or a personalized message from the originator of the document. In this way, consumption of a static document is transformed into an interactive experience through use of the value add services. This also builds a close, collaborative and interactive community amongst the different users that consume the document. Further discussion of these and other examples is included in the following.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a document service 102, a document authoring device 104, and a plurality of client devices, an individual one of which is represented as client device 106. The document service 102, document authoring device 104, and client device 106 are communicatively coupled, one to another, via a network 108, such as the Internet or "World Wide Web."

The document service 102, document authoring device 104, and client device 106 may be implemented using a variety of different computing device configurations. A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" for the document service 102 as further described in relation to FIG. 9.

The document authoring device 104 is illustrated as including a document authoring module 110 that is implemented at least partially in hardware to create a document 112. The document authoring module 110, for instance, may be configured as a word processor, document creator, document conversion utility (e.g., to convert a file in one format into another format), third-party plugin module (e.g., as part of a browser), and so forth. Additionally, although illustrated as implemented locally on the document authoring device 104, functionality of the document authoring module 110 may also be implemented, in whole or in part, as distributed over the network 108, such as part of the document manager module 114. A user of the document authoring device 104, for instance, may have a paid subscription to access document creation functionality of the document service 102, which is accessed through a subscription ID. Other examples are also contemplated.

The document 112 includes a consumption reporting module 116 that is embedded as part of the document 112 and used as part of consumption by respective ones of the client devices 106. The client device 106, for instance, includes a content consumption module 118 implemented at least partially in hardware to render the document 112 for display by the client device 106. The content consumption module 118, for instance, may be formed as a word processing application, document viewer, third party plug-in module, browser, and so forth. The consumption reporting module 116, as embedded as part of the document 112, is configured to communicate consumption data 120 describing consumption of the document 112 by the client device 106 to the document service, which is illustrated as stored in storage. The consumption data 120, for instance, may describe characteristics of the client device 106 consuming the document 112, duration of the consumption, a user of the client device 106, and so forth as further described in relation to FIGS. 2 and 3.

The consumption data 120, collected from a plurality of client devices 106 in a similar way, is then used by the document manager module 114 to control exposure of a value add service 122. For example, the document manager module 114 may control access to the value add services 122 based on overall consumption of the document 112 by the client devices 106. When this overall consumption has exceeded a threshold, for instance, the value add services 122 may be made available to boost engagement of users of the client devices 106 with the document 112. In this way, conventional consumption of the document 112 is expanded through use of these value add services 112 such that an originator of the document 112 (e.g., the document authoring device 104 and respective user) may interact with users of the client devices 106, such as users currently interacting with the document 112.

In the following, an example of creation, configuration, and distribution of the document 112 is described in relation to FIG. 2. An example of communication of consumption data 120 by the client device 106 and use to monitor overall consumption of the document 112 is described in relation to FIG. 3. Control of exposure of value add services 122 to the client devices 106 based on the monitored overall consumption is described in relation to FIG. 4.

Figure 2:
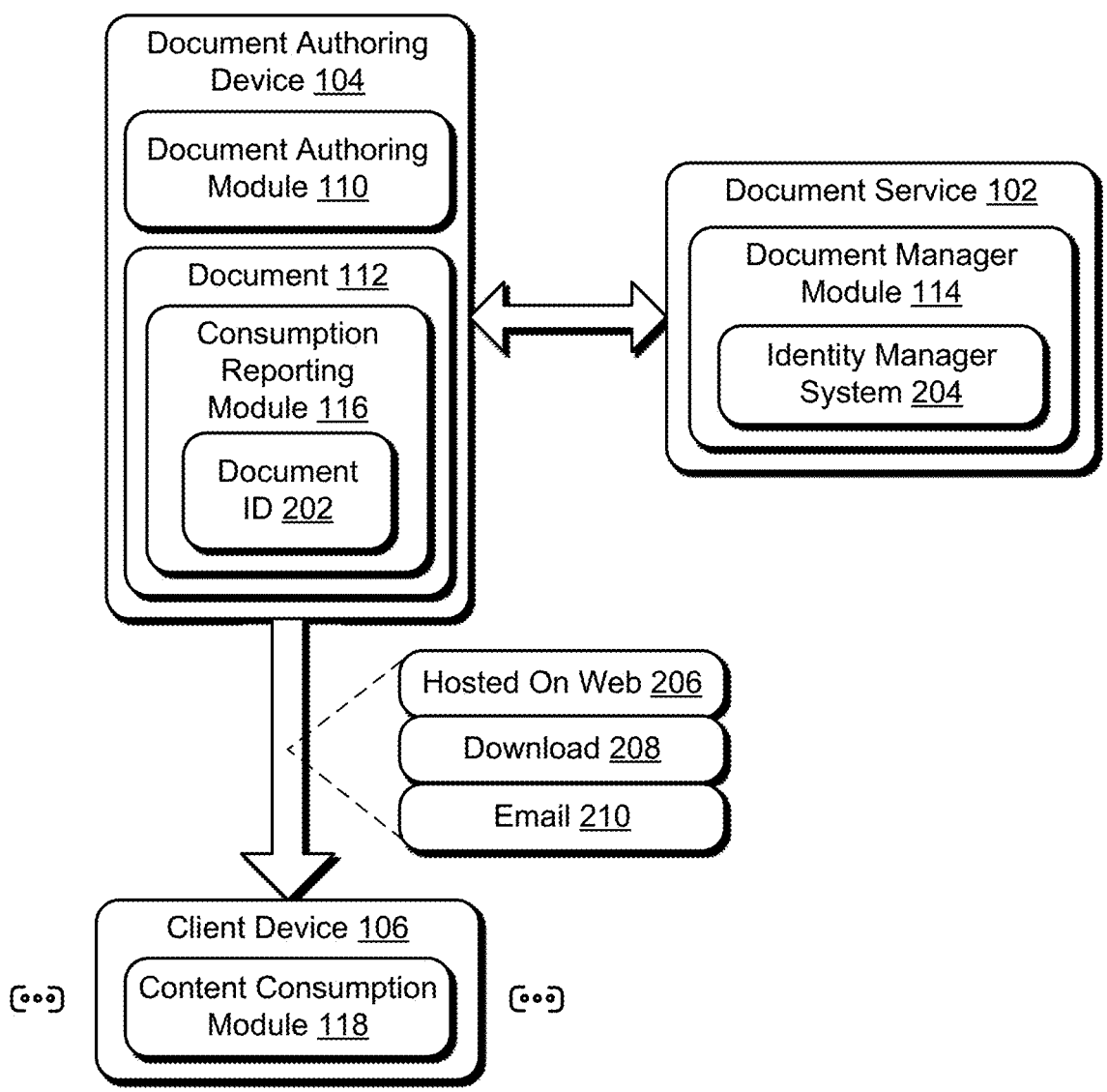
FIG. 2 depicts a system in accordance with one embodiment showing creation, configuration, and distribution of a document of FIG. 1.

FIG. 2 depicts a system 200 in an example implementation showing creation, configuration, and distribution of the document 112 of FIG. 1. In this example, a user of the document authoring device 104 interacts with a document authoring module 110 to create a document 112. The document authoring module 110 may assume a variety of configurations, such as a word processor, document conversion tool (e.g., to change from a native format to a portable document format (PDF)), and so forth. The document 112 may be configured as static and as such not support editing or configured as dynamic and support editing.

In order to configure the document 112 to leverage value add services 122, the document 112 is embedded with a consumption reporting module 116 that is configured to report consumption data 120 as previously described. An author of the document, for instance, may select an option through interaction with the document service 102 that is available as part of a subscription to the service. Once the option is selected, the consumption reporting module 116 is embedded as part of the document 112 along with a document identifier (ID) 202 by an identity manager system 204 of the document service 102. The document ID 202 is usable to uniquely identify the document 112 from other documents also managed as part of control of the value add service. Thus, the document ID 202 is also stored in storage for availability by the document manager module 114 for use as part of this management.

Once configured, the document 112 and embedded consumption reporting module 116 is shared through one or more distribution channels. Examples of distribution channels include hosted on the web 206, available for download 208, sent via an email 210 or other digital message, and so forth. Accordingly, the client device 106 may obtain the document 112 in a variety of different ways for consumption, an example of which is described in the following.

Figure 3:
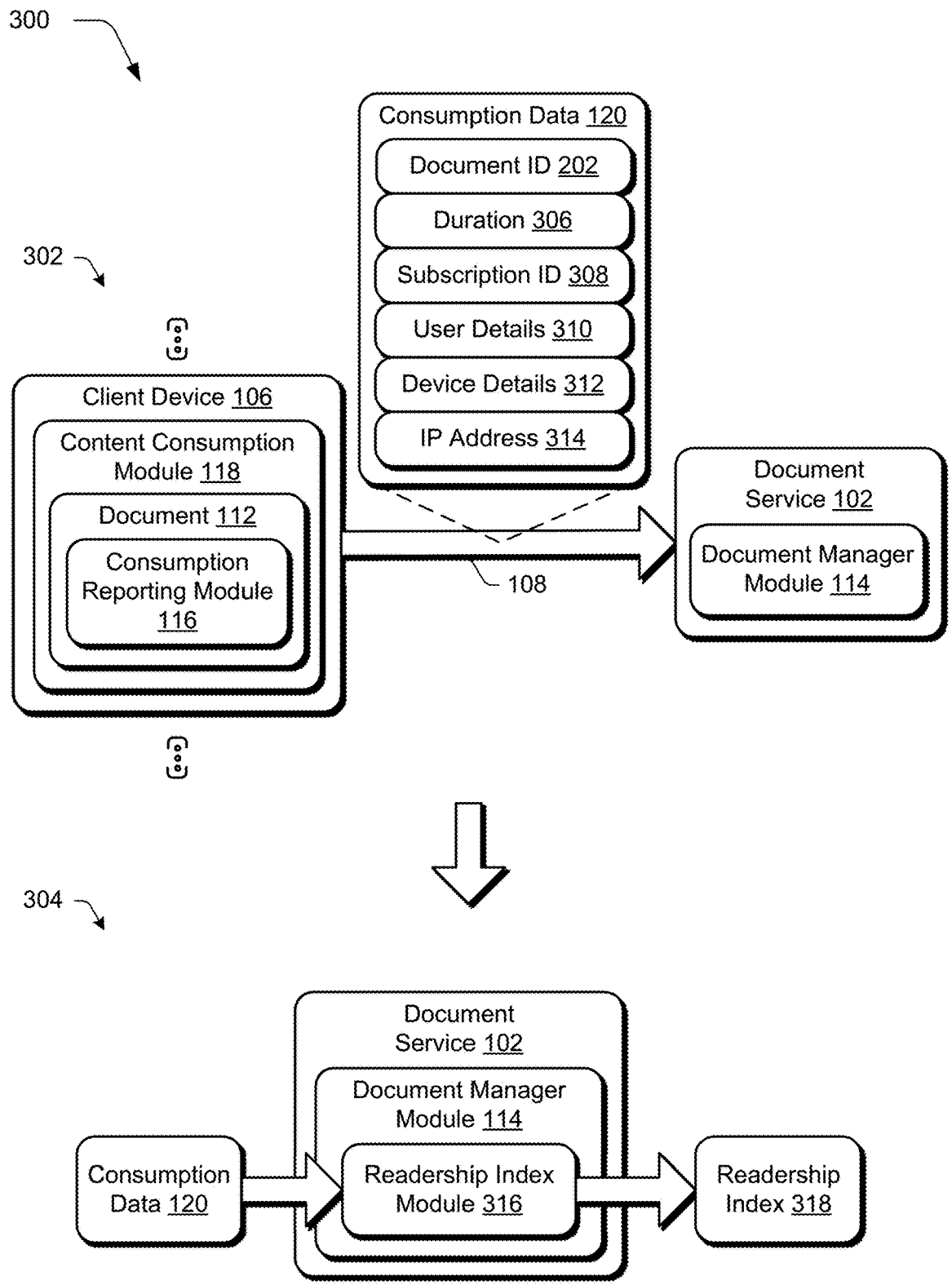
FIG. 3 depicts a system in an example embodiment showing communication of consumption data by a client device and use by a document service to monitor overall consumption of a document.

FIG. 3 depicts a system 300 in an example implementation showing communication of consumption data 120 by the client device 106 and use by the document service 102 to monitor overall consumption of the document 112. This system 300 is illustrated using first and second stages 302, 304. The document 112 may be consumed by hundreds, thousands, and even millions of client devices. A representative client device 106 actively performing this consumption (e.g., rendering) is illustrated at the first stage 302.

As part of the consumption, the consumption reporting module 116 reports consumption data 120 via the network 108 to the document service 102, e.g., in real time. The consumption data 120 may include a variety of information, such as the document ID 202, a duration 306 of the interaction (e.g., the document as a whole or part of the document 112), a subscription ID 308 of the author used to access the document service 102 and/or a user of the client device 106, user details 310 (e.g., demographic data, unique identifier), device details 312 (e.g., type of device or content consumption module 118, hardware characteristics), IP address 314 of the client device 106, and other characteristics such as a distribution channel via which the document 112 was obtained by the client device 106.

At the second stage 304, the document manager module 114 employs a readership index module 316 to calculate a readership index 318 based on the consumption device 120. The readership index 318 describes overall consumption of the document 112 by a plurality of the client devices 106, e.g., the client devices 106 that are currently consuming the content. For example, the readership index is based on a number of the plurality of client devices 106 that consume the document and a duration of the consumption of the document by the client devices 106. A formula for calculating the readership index 318 for the document 112 is shown in the following:

$$f[\text{Document Asset(Author)}]$$

$$\sum_{i=0}^{j} \binom{j}{i} f\left[\text{Readers}\left(\begin{array}{c}\text{Pages Visited, Visits Duration,}\\ \text{Distribution Channel}\end{array}\right)\right]$$

where "j" is the total number of readers of the document 112.

In one or more implementations, the readership index module 316 includes functionality to assign different weights to different distribution channels. An author of the document 112, for instance, may wish to give a higher weight to the document 112 when read online (e.g., weight of five) than a weight given to the same document 112 when read as saved locally by the client device, e.g., a weight of two. These weights, for instance, may be assigned by an originator of the document when configuring the document 112 for use with value add services.

Figure 4:
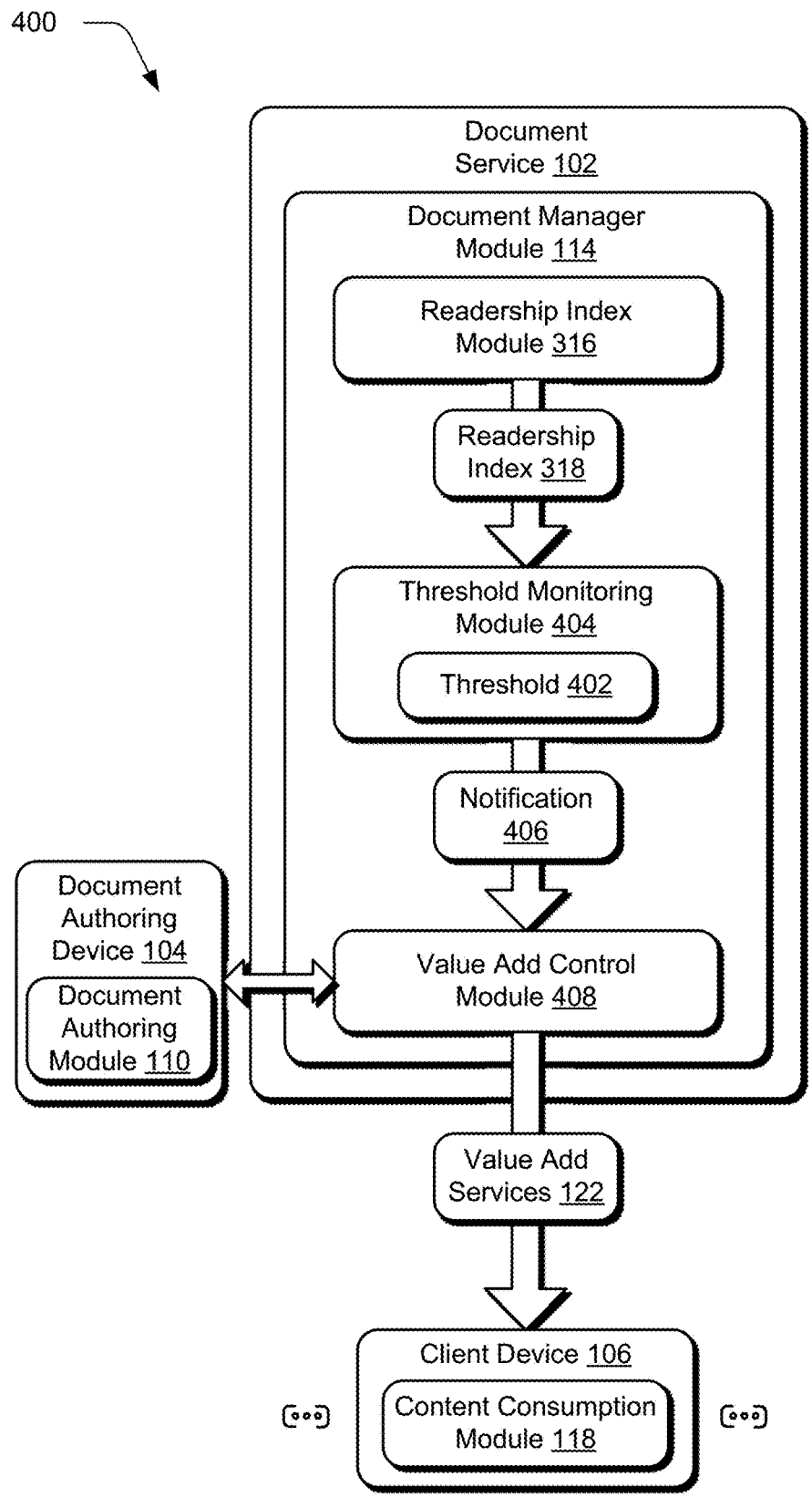
FIG. 4 depicts a system in accordance with one embodiment in which a readership index of FIG. 3 is used as a basis to control exposure of value add services by a document service.
Figure 5:
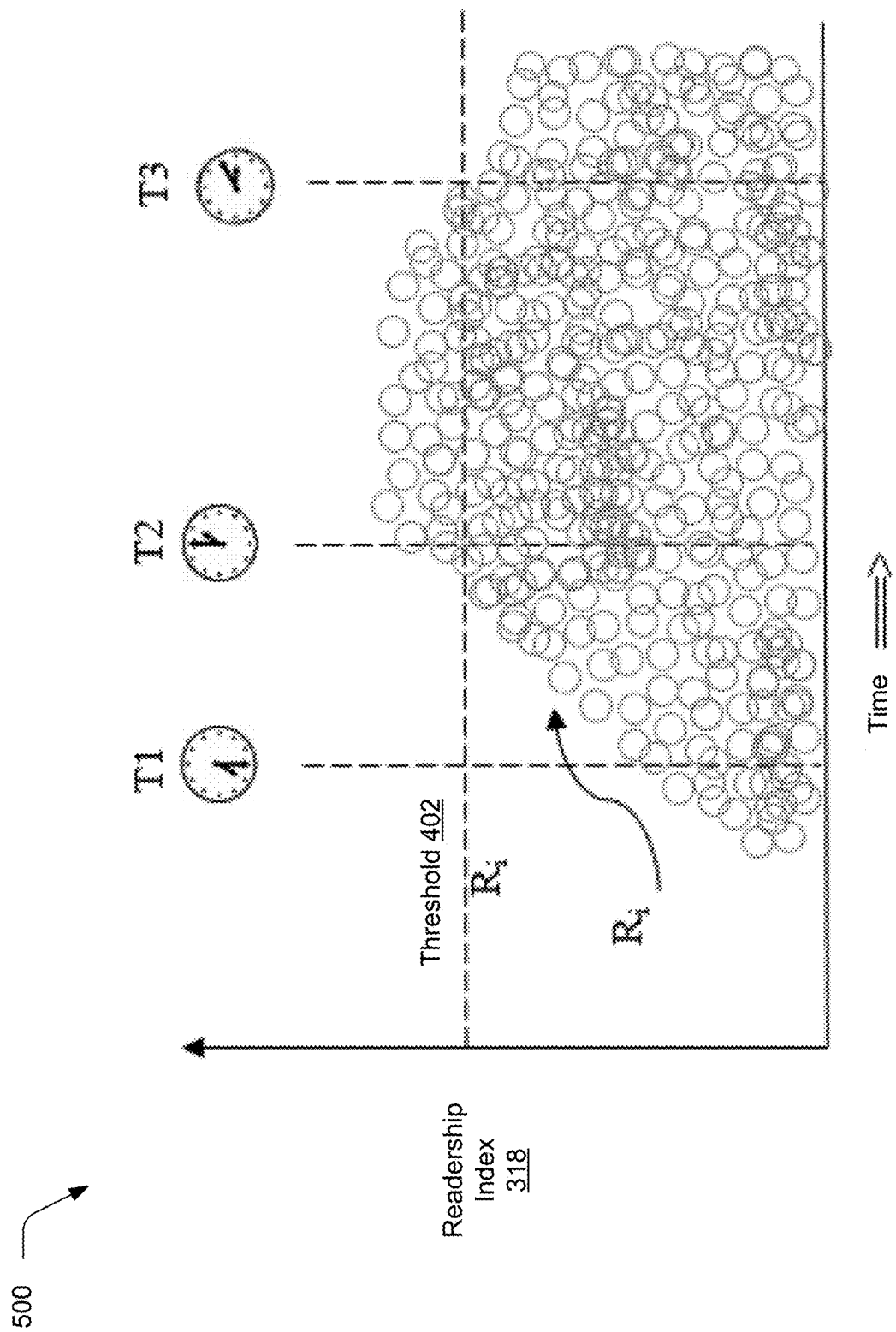
FIG. 5 depicts a user interface in accordance with one embodiment usable to monitor a readership index ($R_i$) by an author of the document.

FIG. 4 depicts a system 400 in an example implementation in which the readership index 318 of FIG. 3 is used as a basis to control exposure of value add services 122 by the document service 102. The readership index 318 is provided by the readership index module 316 to a threshold monitoring module 404 to determine when the readership index 318 exceeds the threshold 402. FIG. 5 depicts a user interface 500 having a graphical illustration used to monitor the readership index 318 ($R_i$) by the threshold monitoring module 404. This graphical illustration may be generated by the document service 102 for viewing in the user interface 500 of the document authoring device 104 in real time as the overall consumption is monitored. The following consumption data is used to calculate the readership index at times "T1" and "T2."

| Parameters | T1 | T2 |
| --- | --- | --- |
| Document Readers Count | {250} | {250} |
| Document viewed duration (seconds) per user | {750} | {1050} |
| Distribution channel weight | {2} | {5} |
| Readership Index ($R_i$) = (Readers Count * Duration Viewed * Weight)/(Readers Count + Duration Viewed) | 375 Units | 1009 Units |

Before clock time "T1," the document authoring device 104 may note that the readership index 318 approaches but does not exceed the threshold 402. At clock time "T1," however, the readership index 318 does cross the threshold 402. Accordingly, the threshold monitoring module 404 outputs a notification 406 to a value add control module 408 to control exposure of value add services 122.

The value add control module 408, for instance, may communicate the notification 406 to an originator of the document 112 (e.g., the document authoring device 104 associated with the author) indicating that the readership index 318 has exceeded the threshold 402. The originator, as part of this notification, may then select from a plurality of value add service options to be communicated to the client devices 106 that are used as a basis to generate this readership index 318. The value add control module 408 may then receive this selection and expose the corresponding value add services 122 to the client device 106.

In another instance, the value add service 122 is exposed automatically and without user intervention to the client device 106, e.g., the value add service 122 is set along with the threshold 402 previously by the document authoring device 104.

Examples of value add services include a question and answer session with an originator of the document, an overview or highlights of the document, promotion of upcoming documents, a live survey, a real time communication session with the originator of the document, or a personalized message from the originator of the document.

In this way, value add services 122 are used to transform consumption of the document 112 into an interactive experience. For example, an author of the document 112 may open a connect session with readers for live interaction with each of the client devices 106 in the same session, thereby giving users of the client devices 106 to ask questions directly with the author. The author can also provide an overview or highlights of the document 112 and conduct live surveys since the author is aware of a number of client devices 106 currently available to respond to the survey.

The author may also use this opportunity provided by the value add services 122 to promote upcoming materials, e.g., documents currently being authored or made available for publishing. This helps engage users of the client devices 106 through this interaction as part of a real time live interaction experience. This also helps to increase adoption of subscriptions to the document service 102, e.g., to use this functionality themselves or other functionality of the service.

The document manager module 114, and more particularly the readership index module 316 and the threshold monitoring module 404, may continue to monitor how the readership index 318 relates with respect to the threshold 402. If at any point in time, the threshold monitoring module 404 determines that the readership index 318 has dipped back below the threshold 402 (e.g., at time "T3" in FIG. 5), the module may also output a notification to the document authoring device 104 indicating this to provide an option to gradually shut down exposure of the value add services 122. The document authoring device 104 may also be given an option to communicate this to the client devices 106 to indicate to users of these devices to continue interaction with the service or otherwise execution of the value add service will terminate.

Figure 6:
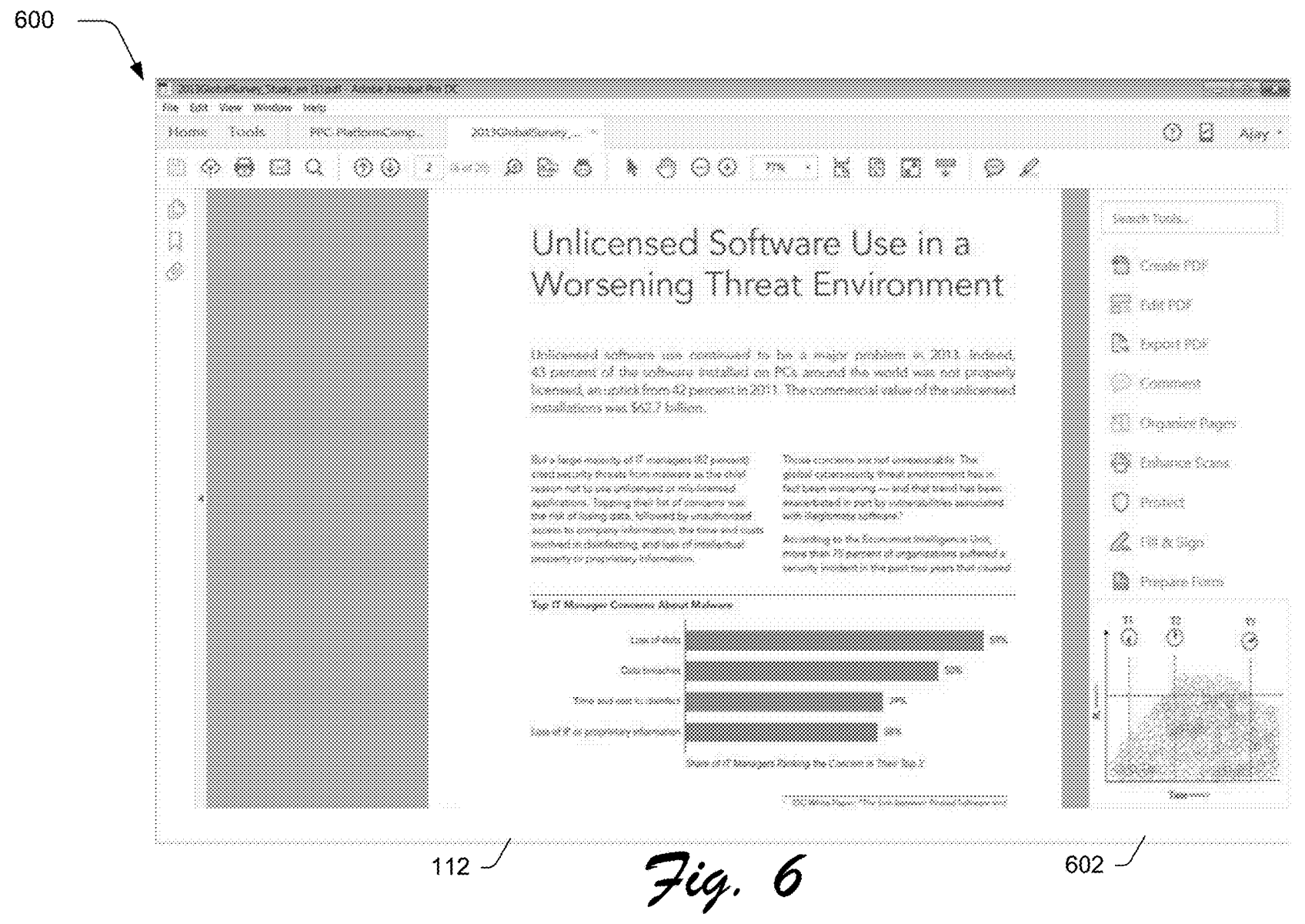

In order to promote interaction between the client devices 106 and the document authoring device 104, the document service 102 may also be configured to output a user interface showing the readership index 318 to the client devices 106. As shown in an example user interface 600 of FIG. 6, for instance, a document 112 is concurrently displayed with a portion 602 of a readership index. In this way, users of the client devices 106 are provided with real time data on how many other client devices are concurrently interacting with (e.g., reading) the document and receiving value add services 122 as part of this interaction. This helps to build a close, collaborative and interactive community amongst the different users of the client devices 106 involving the same document 112. Further discussion of these and other examples is included in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

FIG. 7 depicts a procedure 700 in an example implementation in which control is described of exposure of value add services as part of document consumption. A digital medium environment is configured to control availability of a value add service to consumers of a document. Consumption data is collected from a plurality of client devices. The consumption data describes characteristics of consumption of the document by respective client devices (block 702). Characteristics of consumption include an identifier of the document, a duration specifying an amount of time the document was consumed, a subscription identifier specifying a subscription associated with a respective user that consumed the document, details describing characteristics of the respective user, details describing characteristics of a respective said client device used to consume the document, or an IP address of the respective said client device used to consume the document.

A readership index is calculated that describes an amount of overall consumption of the document by the plurality of client devices (block 704). For example, the readership index may be based on a number of the plurality of client devices that consume the document and a duration of the consumption of the document by the client devices. An example of this is shown in the previously described table in which the readership index is calculated as (the number of the plurality of client devices that consumed the document multiplied by duration of the consumption of the document by the plurality of client devices multiplied by a weight of a distribution channel used by the client devices to obtain the document) divided by (the number of the plurality of client devices that consumed the document added to the duration of the consumption of the document by the plurality of client devices).

Responsive to a determination by the computing device that the readership index has exceeded a threshold, the value add service that relates to the document is exposed for interaction by at least one of the plurality of client devices (block 706). Examples of value add services include a question and answer session with an originator of the document, an overview or highlights of the document, promotion of upcoming documents, a live survey, a real time communication session with the originator of the document, or a personalized message from the originator of the document.

Figure 8:
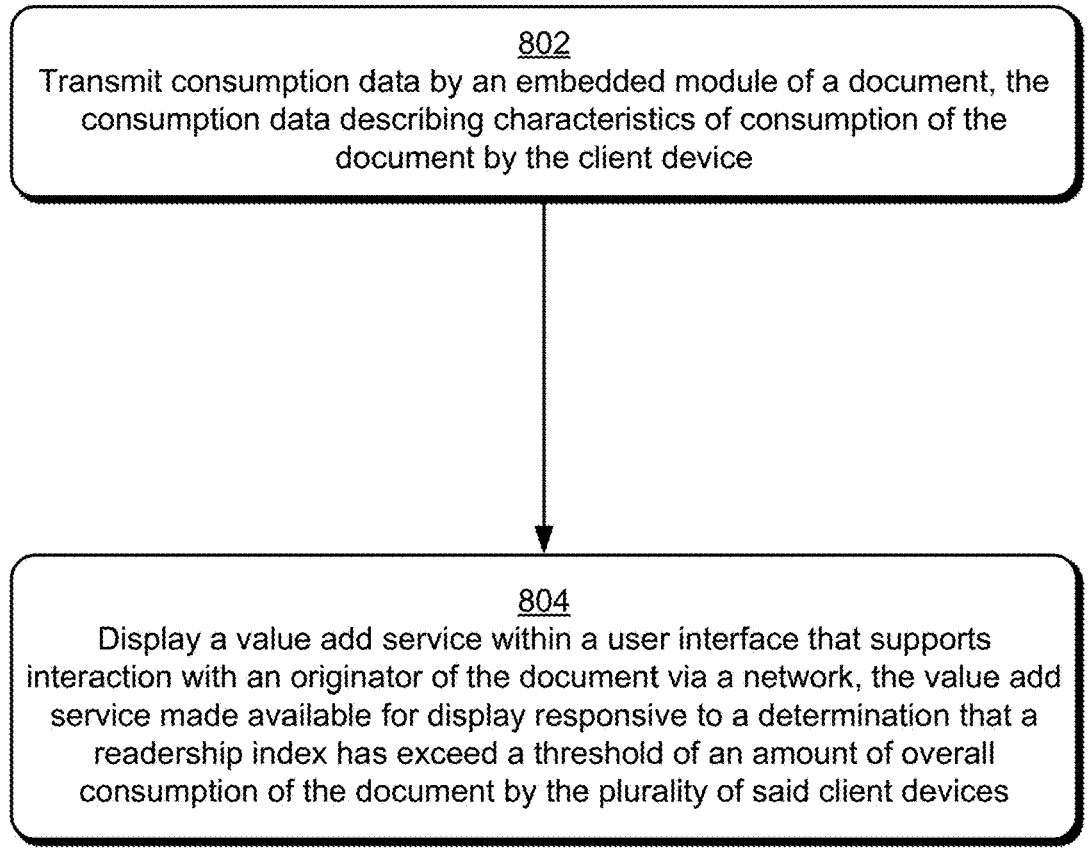
FIG. 8 is a flow diagram depicting a procedure in accordance with one embodiment in which a value add service is exposed to a user of a client device that consumes a document.

FIG. 8 depicts a procedure 800 in an example embodiment in which a value add service is exposed to a user of a client device that consumes a document. Consumption data is transmitted by an embedded module of the document using the client device. The consumption data describes characteristics of consumption of the document by the client device (block 802). For example, the consumption data 120 may be transmitted in real time by a consumption reporting module 116 as the document 112 is consumed (e.g., rendered) by the client device 106.

A value add service is displayed within a user interface that supports interaction with an originator of the document via a network. The value add service is made available for display responsive to a determination that a readership index has exceed a threshold of an amount of overall consumption of the document by the plurality of said client devices (block 804). As before, a variety of value add services may be output.

Example System and Device

Figure 9:
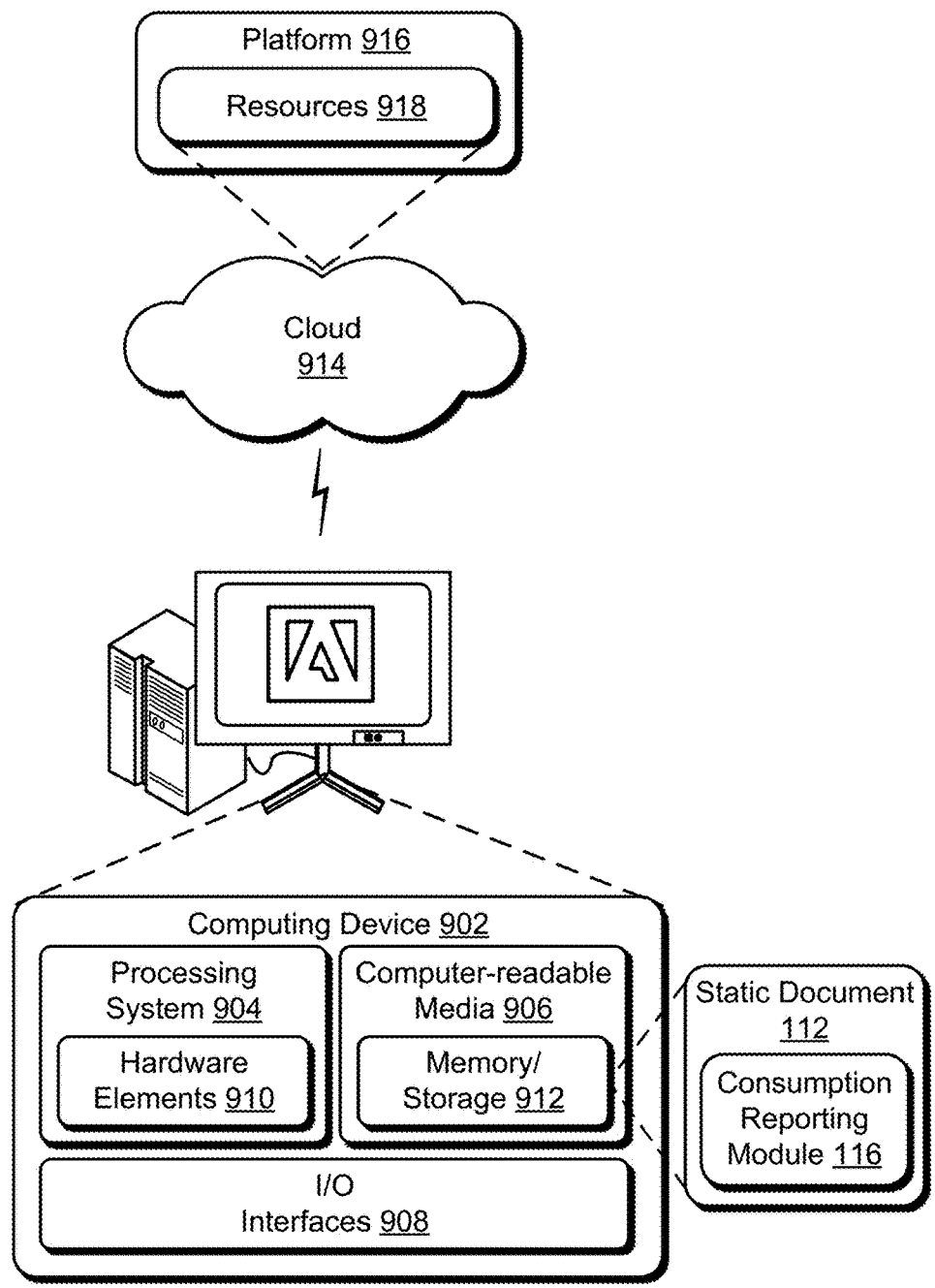
FIG. 9 illustrates an example system in accordance with one embodiment including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the static document and consumption reporting module 116. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control availability of a service via a network to consumers of a document, a method implemented by at least one computing device, the method comprising:

collecting, by the at least one computing device, consumption data from a plurality of client devices, the consumption data describing characteristics of consumption of the document by the plurality of client devices;

calculating, by the at least one computing device, a readership index from the consumption data wherein the readership index is calculated based on a number of the plurality of client devices that consumed the document, a duration of the consumption of the document by the plurality of client devices, and a weight of a distribution channel used by the plurality of client devices to obtain the document; and responsive to a determination by the at least one computing device that the readership index has exceeded a threshold, exposing the service relating to the document for interaction by at least one of the plurality of client devices via the network.

2. The method as described in claim 1, wherein the consumption data is collected by the at least one computing device using an embedded module of the document.

3. The method as described in claim 1, wherein the characteristics of consumption include an identifier of the document.

4. The method as described in claim 1, wherein the readership index is calculated as (the number of the plurality of client devices that consumed the document multiplied by the duration of the consumption of the document by the plurality of client devices multiplied by the weight of the distribution channel used by the plurality of client devices to obtain the document) divided by (the number of the plurality of client devices that consumed the document added to the duration of the consumption of the document by the plurality of client devices).

5. The method as described in claim 1, wherein the threshold is defined by an originator of the document.

6. The method as described in claim 1, further comprising:

communicating, by the at least one computing device, a notification to an originator of the document indicating that the readership index has exceeded the threshold.

7. The method as described in claim 1, wherein the document is static.

8. The method as described in claim 1, wherein the service is configured as a real time communication session.

9. The method as described in claim 8, wherein the real time communication session includes a live survey.

10. The method as described in claim 1, wherein the service includes a question and answer session.

11. The method as described in claim 1, wherein the characteristics of consumption include an IP address.

12. In a non-transitory digital medium environment to control availability of a service via a network to consumers of a static document, a system comprising:

a readership index module implemented at least partially in hardware to calculate a readership index from consumption data describing characteristics of consumption of the static document by a plurality of client devices, wherein the consumption data includes a number of the plurality of client devices that consumed the static document, a duration of consumption of the static document by the plurality of client devices, and a weight of a distribution channel used by the plurality of client devices to obtain the static document; and a control module implemented at least partially in the hardware to expose the service based on the readership index exceeding a threshold for interaction by at least one of the plurality of client devices via the network, the service including a communication session with an originator of the static document.

13. The system as described in claim 12, further comprising a threshold monitoring module implemented at least partially in the hardware to determine whether the readership index has exceeded the threshold and wherein the control module is configured to expose the service based on the readership index exceeding the threshold.

14. The system as described in claim 12, wherein the consumption data is transmitted using an embedded module of the static document.

15. The system as described in claim 12, wherein the communication session is a real time communication session.

16. In a non-transitory digital medium environment to control availability of a service to consumers of a document, a method implemented by a first client device, the method comprising:

transmitting, by the first client device, consumption data by an embedded module of the document, the consumption data describing characteristics of consumption of the document by a second client device and a third client device, the consumption data including an IP address of the second client device and a subscription identifier specifying a subscription associated with a user of the second client device; and displaying, by the first client device, the service within a user interface that supports interaction with an originator of the document via a network, the service made available for display responsive to a determination that a readership index has exceeded a threshold, the readership index calculated based on a number of the second and third client devices that consumed the document, a duration of consumption of the document by the second and third client devices, and a weight of a distribution channel used by the second and third client devices to obtain the document.

17. The method as described in claim 16, wherein the characteristics of consumption include an identifier of the document.

18. The method as described in claim 16, wherein the second client device is currently consuming the document.

19. The method as described in claim 16, wherein the service includes a live survey.

20. The method as described in claim 16, wherein the service includes a personalized message, a question and answer session, or a real time session.

* * * * *